US008214624B2

(12) United States Patent
Berglas et al.

(10) Patent No.: US 8,214,624 B2
(45) Date of Patent: Jul. 3, 2012

(54) PROCESSING LONG-LATENCY INSTRUCTIONS IN A PIPELINED PROCESSOR

(75) Inventors: Morrie Berglas, London (GB); Yoong Chert Foo, London (GB)

(73) Assignee: Imagination Technologies Limited, Hertfordshire (GB)

( * ) Notice: Subject to any disclaimer, the term of this patent is extended or adjusted under 35 U.S.C. 154(b) by 587 days.

(21) Appl. No.: 11/805,364

(22) Filed: May 23, 2007

(65) Prior Publication Data

US 2008/0244247 A1    Oct. 2, 2008

(30) Foreign Application Priority Data

Mar. 26, 2007    (GB) .................................. 0705804.3

(51) Int. Cl.
*G06F 9/30* (2006.01)
*G06F 9/40* (2006.01)
*G06F 9/00* (2006.01)
*G06F 9/44* (2006.01)
*G06F 7/38* (2006.01)

(52) U.S. Cl. ....................................... 712/216; 712/244

(58) Field of Classification Search .................. 712/216, 712/214

See application file for complete search history.

(56) References Cited

U.S. PATENT DOCUMENTS

| | | | | |
|---|---|---|---|---|
| 5,961,630 | A | * | 10/1999 | Zaidi et al. ..................... 712/200 |
| 5,996,064 | A | * | 11/1999 | Zaidi et al. ..................... 712/216 |
| 6,035,389 | A | * | 3/2000 | Grochowski et al. ......... 712/216 |
| 6,490,674 | B1 | | 12/2002 | Arnold et al. |
| 6,711,670 | B1 | | 3/2004 | Soltis, Jr. et al. |
| 6,715,060 | B1 | | 3/2004 | Arnold et al. |
| 6,757,811 | B1 | | 6/2004 | Mukherjee |
| 2001/0034827 | A1 | | 10/2001 | Mukherjee et al. |
| 2001/0037448 | A1 | | 11/2001 | Mukherjee et al. |
| 2002/0129227 | A1 | | 9/2002 | Arakawa |
| 2004/0163083 | A1 | | 8/2004 | Wang et al. |

(Continued)

FOREIGN PATENT DOCUMENTS

WO    WO 2006/016927 A2    2/2006

(Continued)

OTHER PUBLICATIONS

United Kingdom Patent Office Search Report dated Jul. 6, 2007 (2 pages).

(Continued)

*Primary Examiner* — Eddie P Chan
*Assistant Examiner* — William Partridge
(74) *Attorney, Agent, or Firm* — Flynn, Thiel, Boutell & Tanis, P.C.

(57) ABSTRACT

There are provided a method and a processor for processing a thread. The thread includes a plurality of sequential instructions. The plurality of sequential instructions include some short-latency instructions and some long-latency instructions and at least one hazard instruction. The hazard instruction requires one or more preceding instructions to be processed before the hazard instruction is processed. The method includes the steps of: a) before processing each long-latency instruction, incrementing by one, a counter associated with the thread; b) after each long-latency instruction has been processed, decrementing by one, the counter associated with the thread; c) before processing each hazard instruction, checking the value of the counter associated with the thread, and i) if the counter value is zero, processing the hazard instruction, or ii) if the counter value is non-zero, pausing processing of the hazard instruction until a later time. The processor includes means for performing steps a), b) and c) of the method.

34 Claims, 4 Drawing Sheets

U.S. PATENT DOCUMENTS

2004/0215933 A1    10/2004   Nguyen et al.
2004/0225868 A1*  11/2004   Kim et al. ..................... 712/214
2005/0022196 A1*  1/2005    Davis et al. ................... 718/100

FOREIGN PATENT DOCUMENTS

WO    WO 2006/083543 A2    8/2006

OTHER PUBLICATIONS

International Search Report and Written Opinion of the International Searching Authority issued in PCT/GB2008/00479, mailed Jul. 8, 2008 (10 sheets).

* cited by examiner

PROCESSING LONG-LATENCY INSTRUCTIONS IN A PIPELINED PROCESSOR

FIELD OF THE INVENTION

The invention relates to a method and a pipelined processor for processing a thread in the pipelined processor. Particularly, but not exclusively, the invention relates to a method a multi-threaded pipeline processor for processing a plurality of threads in the multi-threaded pipeline processor.

BACKGROUND OF THE INVENTION

In computer architecture, a data hazard is a problem that can occur in a pipelined processor. Instructions in a pipelined processor are performed in several stages so that, at any given time, several instructions are being executed. However, the instructions may not be completed in a desired order. The data hazard occurs and causes an error when two or more of these simultaneous and possibly out-of-order instructions conflict.

The data hazards occur when data is modified. The data hazard can occur in the following situations: 1) Read after Write (RAW): An operand is modified and read soon thereafter. Because the first instruction may not have finished writing to the operand, the second instruction may use incorrect data; 2) Write after Read (WAR): Read an operand and write soon thereafter to the same operand. Because the write may have finished before the read, the read instruction may incorrectly get the new written value; and 3) Write after Write (WAW): Two instructions that write to the same operand are performed. The first one may finish after the second and therefore leave the operand with an incorrect data value. The operands involved in the data hazards can reside in a memory or in a register.

The instruction set of the pipelined processor may contain special instructions which have exceptionally high latencies relative to standard instructions. A primary example would be an instruction which fetches data from memory. The problem of the data hazards is relatively easy to avoid for low latency instructions i.e. instructions that can be completed in a small number of clock ticks, because it is relatively easy to ensure that the instructions within a particular thread are completed in the issued order. However, when high latency instructions are included in a thread, the problem of the data hazards is more significant because there is more likelihood that the instructions in the particular thread will not complete in the issued order.

These problems arise in all sorts of circumstances e.g. in 3D graphics processors, in Central Processing Units (CPUs) including dedicated media CPUs in which real time inputs are being received, and in communication with multi-processor systems.

To deal with the high latency instructions, the processor should ideally provide a mechanism to swap out a thread which is waiting for instructions to complete. However, certain requirements also have to be fulfilled.

First, in a multi-threaded processor, many threads might have potential data hazards i.e. instructions which depend upon preceding instructions that must be completed, before the instructions are processed.

Second, each thread might have a large number of long latency instructions, which could be adjacent in the stream. It must be possible to allow the return data from the long latency instructions to come back in a different order from which they were dispatched. Given that there could be a number of the long latency instructions being processed at one time, processor stalling should be reduced as much as possible due to the data hazards from the long latency instructions.

Third, it has to be possible to skip over any instructions in the thread where there is a branch in the thread, especially the instructions which might cause the data hazard, because the instructions depend upon preceding instructions that must be completed before the instructions are processed.

Fourth, it must be possible to read results in a different order than they were written.

Fifth, there shall be no penalty for multiple read accesses of destinations.

Sixth, it also must be permitted for the same destination to be written to and re-used as a destination for another long latency instruction.

Finally, it is preferable that no dedicated or mass storage is needed in processing the long latency instructions and potential data hazard instructions. It is also preferable that gate costs are kept to be a minimum.

It is an object of the invention to provide a method and an apparatus for processing threads which mitigates or overcomes the problem of the data hazards in the long latency operations.

SUMMARY OF THE INVENTION

According to a first aspect of the invention, there is provided a method for processing a thread in a pipelined processor. The thread comprises a plurality of sequential instructions, and the plurality of the sequential instructions comprise some short-latency instructions, some long-latency instructions and at least one hazard instruction. The hazard instruction requires one or more preceding instructions to be processed before the hazard instruction is processed. The method comprises the steps of: a) before processing each long-latency instruction, incrementing by one, a counter associated with the thread; b) after each long-latency instruction has been processed, decrementing by one, the counter associated with the thread; c) before processing each hazard instruction, checking a value of the counter associated with the thread, and d) i) if the counter value is zero, processing the hazard instruction, or ii) if the counter value is non-zero, pausing processing of the hazard instruction until a later time.

Thus, if the counter is non-zero, which means that one or more long latency instructions are being processed and are still outstanding, the hazard instruction is put on hold. This means that there is no possibility that the hazard instruction could be processed before any preceding threads, thereby causing a data hazard. The short-latency instructions are instructions which can be completed within a certain, predetermined number of clock ticks. The long-latency instructions are instructions which require more than the predetermined number of clock ticks to be completed.

Preferably, the method is for processing a plurality of threads, and each thread has a respective counter associated therewith. The plurality of the threads are the threads which may be resident at any one time. In a preferred embodiment, the number of resident threads is 16.

Preferably, each thread in the processor is, at any time, either being processed, waiting to be processed, or paused in accordance with step d)ii).

Preferably, at any time, a subset of the plurality of the threads is being processed. In one preferred embodiment, the number of the threads in the subset is 4.

Preferably, the method further comprises the step of processing the subset of the threads by executing one instruction from each thread in the subset in a round robin manner.

Advantageously, the number of the threads in the subset is equal to the maximum number of clock ticks required to process the short-latency instruction. In this way, for the short latency instructions, there is no possibility of the data hazards.

In one embodiment, the method further comprises the step of: after processing the final instruction of the thread, removing the thread from the subset of the plurality of the threads. Thus, once the thread has been completely processed, there is a space available in the subset.

Preferably, the method further comprises the step of: periodically checking the value of the counter associated with any threads having instructions that have been paused in accordance with step d)ii); and, if the value of the counter of the thread is zero, transitioning that thread to a waiting-to-be-processed state. Thus, once the counter of the thread has reduced to zero, we know that there are no long latency instructions still outstanding. Thus, the pausing of the thread (in accordance with step d)ii)) can now be removed. In one embodiment, the step of checking is carried out on every clock tick.

Preferably, the processor is arranged to process any number of the threads up to the plurality of threads, such that, at any time, zero, one or more locations of the plurality of the thread are empty.

Preferably, each thread has a plurality N of respective counters associated therewith and step c) of the method comprises: before processing each hazard instruction, checking the value of at least one of the N counters associated with the thread; and i) if all of the values of at least one of the counters are zero, processing the hazard instruction, or ii) if one or more of the values of at least one of the counters are non-zero, pausing processing of the hazard instruction until a later time.

Then, preferably, each long-latency instruction includes an indication of which of the N counters should be incremented before the long-latency instruction is processed and decremented after the long-latency instruction is processed.

Also preferably, either each hazard instruction is preceded by an instruction that includes an indication that the N counters should be checked before the hazard instruction is processed, or each hazard instruction itself includes an indication of which of the N counters should be checked before the hazard instruction is processed.

With this arrangement, the use of the N hazard counters can be optimized. For example, a particular hazard instruction might depend on a first long latency instruction being processed, but not on a second long latency instruction. In that case, the first long latency instruction may include an indication that the nth counter should be incremented before it is processed, and the second long latency instruction may include an indication that the mth counter should be incremented before it is processed. Then, the hazard instruction may include an indication that only the nth counter of the N counters should be checked before it is processed.

There is also provided a computer program which, when run on computing means, causes the computing means to carry out the method of the first aspect of the invention. There is also provided a record carrier storing thereon such a computer program.

According to a second aspect of the invention, there is provided a pipelined processor for processing a thread, and the thread comprises a plurality of sequential instructions. The plurality of the sequential instructions comprise some short-latency instructions, some long-latency instructions and at least one hazard instruction. The hazard instruction requires one or more preceding instructions to be processed before the hazard instruction is processed. The processor comprises: a counter associated with the thread; means for incrementing the counter by one, before each long-latency instruction is processed; means to decrement the counter by one, after each long-latency instruction has been processed; means for checking the value of the counter associated with the thread, before each hazard instruction is processed; and means for processing the hazard instruction if the counter value is zero, or pausing processing of the hazard instruction until a later time if the counter value is non-zero.

In one preferred embodiment, the means for incrementing the counter and the means for decrementing the counter include an instruction decoder. The instruction decoder can distinguish between the short-latency instructions and the long-latency instructions.

In one preferred embodiment, the processor further comprises a thread manager, and the counter is maintained by the instruction decoder but can be accessed by the thread manager.

Preferably, the means for checking the value of the counter associated with the thread before the hazard instruction is processed includes the instruction decoder, and the instruction decoder can distinguish between the hazard instructions and the remaining instructions.

Preferably, the processor is suitable for processing a plurality of the threads. Each thread has a respective counter associated therewith. In one preferred embodiment, there are 16 threads in the plurality of the threads.

Preferably, each thread in the processor is, at any time, either being processed, waiting to be processed, or paused. Preferably, the thread manager keeps track of the state of each resident thread in the processor.

Preferably, at any time, a subset of the plurality of the threads is being processed. In one preferred arrangement the number of the threads in the subset is 4.

In one embodiment, the processor further comprises means for processing the subset of the threads by executing one instruction from each thread in the subset in a round robin manner.

Advantageously, the number of the threads in the subset is equal to the maximum number of clock ticks required to process the short-latency instruction. Thus, there will be no data hazard problems for the short latency instructions.

Preferably, the processor is arranged, after processing the final instruction of the thread, to remove the thread from the subset of the plurality of the threads. This transitioning between states is preferably performed by the thread manager.

Preferably, the processor is arranged to periodically check the value of the counter associated with any threads having instructions that have been paused, and, if the value of the counter of a thread is zero, to transition that thread to the waiting-to-be-processed state. Again, preferably, the checking and transitioning are performed by the thread manager. The checking may be carried out once every clock tick.

Preferably, the processor is arranged to process any number of the threads up to the plurality of the threads, such that, at any time, zero, one or more locations of the plurality of the thread are empty.

In one embodiment, each thread has a plurality N of respective counters associated therewith. The means for checking the value of the counter associated with the thread comprises: means for checking the value of at least one of the N counters associated with the thread, before each hazard instruction is processed; and means for processing the hazard instruction if all of the values of at least one of the counters are zero, or pausing processing of the hazard instruction until a later time if one or more of the values of at least one of the counters are non-zero.

In that case, each long-latency instruction may include an indication of which of the N counters should be incremented before the long-latency instruction is processed and decremented after the long-latency instruction is processed.

Also, each hazard instruction may be preceded by an instruction that includes an indication of which of the N counters should be checked before the hazard instruction is processed. Alternatively, each hazard instruction may include an indication of which of the N counters should be checked before the hazard instruction is processed.

Features described in relation to one aspect of the invention may also be applicable to the other aspect of the invention.

BRIEF DESCRIPTION OF THE DRAWINGS

Exemplary embodiments of the invention will now be described with reference to the accompanying drawings, of which

DETAILED DESCRIPTION OF A PREFERRED EMBODIMENT

Figure 1:
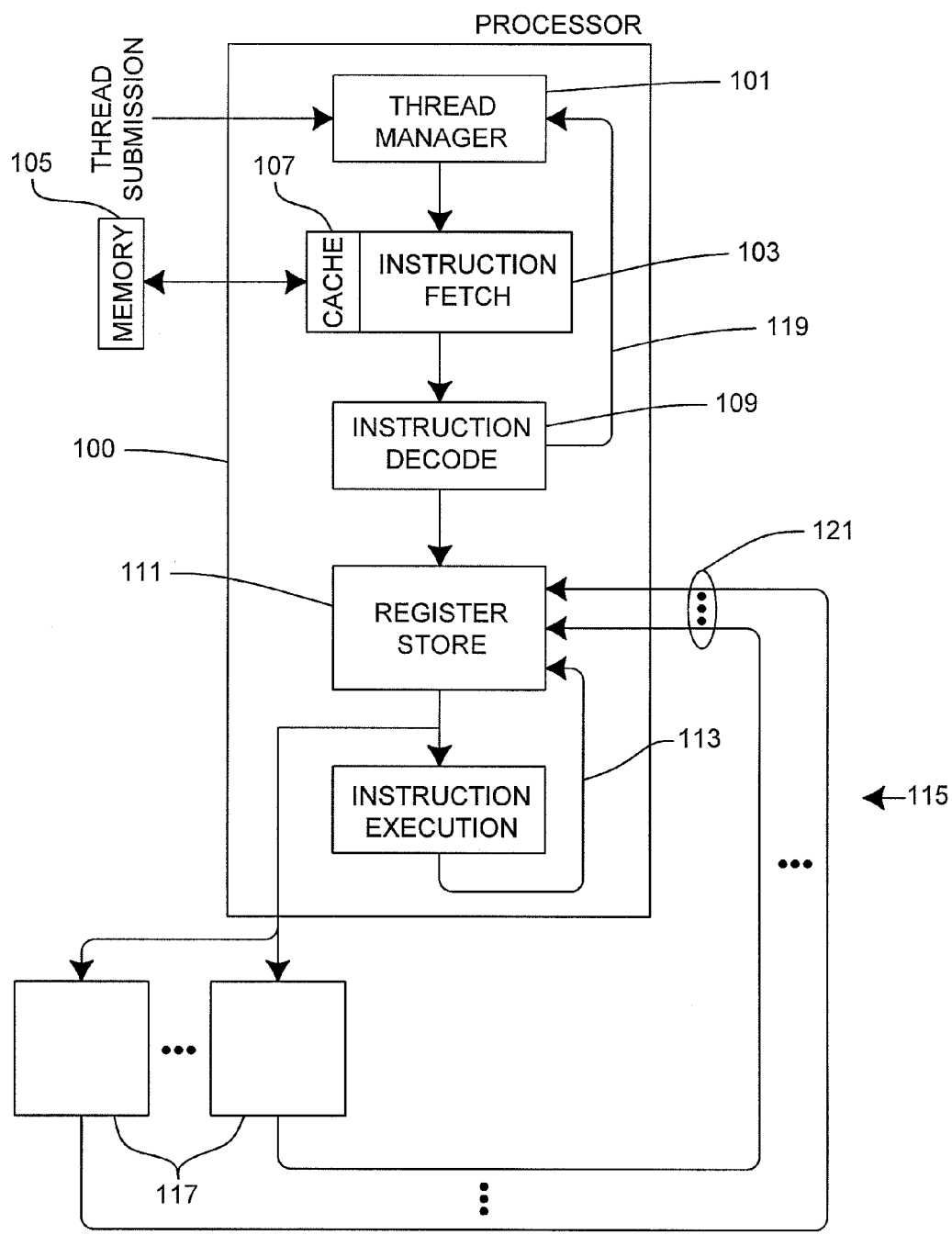
FIG. 1 is a diagram of a multi-threaded processor according to an embodiment of the invention.

FIG. 1 shows a multi-threaded processor according to one embodiment of the invention. The processor 100 comprises a thread manager 101 which receives submissions of threads to be processed. The thread manager 101 is connected to an instruction fetcher 103, which can fetch the appropriate instruction, as indicated by the thread manager 101, from an external memory 105 or internal cache 107. The fetched instruction then goes to an instruction decoder 109. The register store 111 forwards the instructions for execution, and the result is returned and inputted into the register store. The register store also fetches the source arguments to be sent down to instruction execution.

In this embodiment, the multi-threaded processor can deal with two categories of instructions. The first category comprises low latency (or short latency) instructions where the instruction result is written back to the register store in a deterministic and few number of clock ticks. These instructions execute within the processor 100. Examples of such instructions are simple addition and multiplication. These low-latency instructions are relatively easy to handle and are shown at loop 113 in FIG. 1.

The second category comprises high-latency (or long latency) instructions where the instruction result is written back to the register store from an external unit with a variable and unpredictable latency, which could be as large as dozens of clock ticks. These instructions are shown at loop 115 in FIG. 1. These high latency instructions send processing requests to external units 117 such as memory interfaces, texture sampling units and math co-processors. Note that, in FIG. 1, the units are shown to be outside the processor module 100, but this is not necessary. They are tightly coupled with the processor 100 and are likely on the same die.

Operation of the processor 100 of FIG. 1 will now be described, firstly for the low-latency instructions, and secondly for the high-latency instructions. Operation is performed so as to avoid the data hazards. In the processor, once an instruction has begun execution i.e. it has left the thread manager 101 and has been sent to the instruction fetcher, it cannot stop. Any hazards cause the processor pipeline to stall until the data hazard is cleared.

Figure 2:
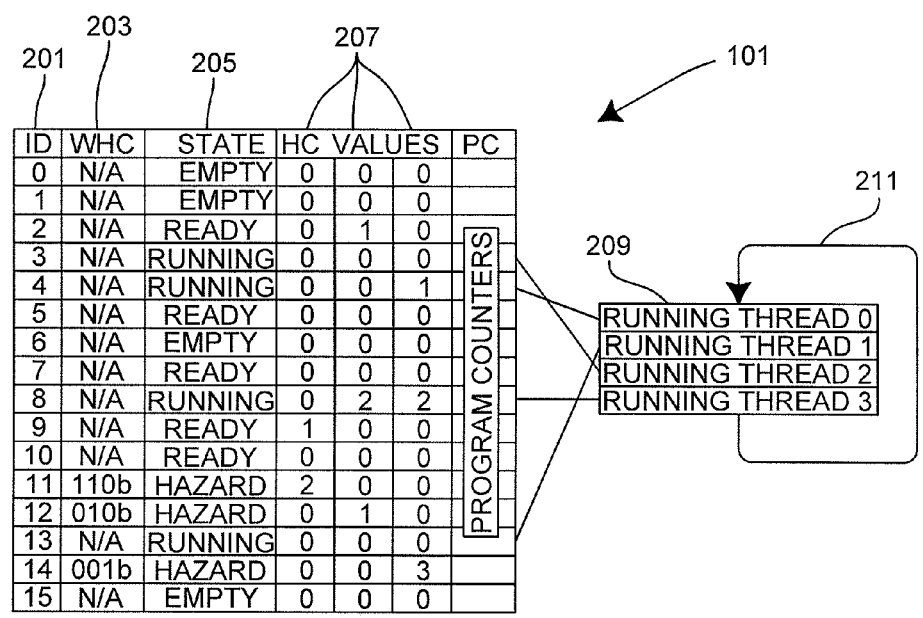
FIG. 2 is a schematic diagram of the thread manager of FIG. 1.

FIG. 2 is a schematic diagram of the thread manager 101. The multi-threaded processor 100 is configured to have a certain number of resident threads that can simultaneously exist on the processor. In the example shown in FIG. 2, this number is 16. Each of the 16 resident threads has an ID 201. At any given time, each thread is in a particular state 205. The four possible states are "empty", "ready", "running" and "hazard", and the four states will be further described below. The values in columns 203 and 207 will also be described below.

From those 16 resident threads, a subset 209 of the threads is in the "running" state at any time. The thread manager 101 executes one instruction from each running thread in a round robin manner on a clock tick by clock tick basis (see 211). The number of the threads in the subset that can be in the "running" state at any time is equal to the largest number of the clock ticks taking to process the low latency instructions. Thus, it is guaranteed that the processing of a particular instruction is completed in a single cycle such that a later instruction in the same thread cannot be processed until the earlier instruction has been processed. In the example in FIG. 2, the number in the "running" subset 209 is equal to 4. Thus, as long as there are four resident threads running there will be no data hazard penalties on the low latency instructions.

Referring to FIG. 2, the thread manager 101 keeps track of the state of each resident thread. As already discussed, the "running" state means that the thread is currently being executed. The "empty" state means that there is no resident thread present for this ID 201. The "ready" state means that the thread is ready to be executed as soon as there is space in the "running" subset 209. The "hazard" state will be described below.

Figure 3:
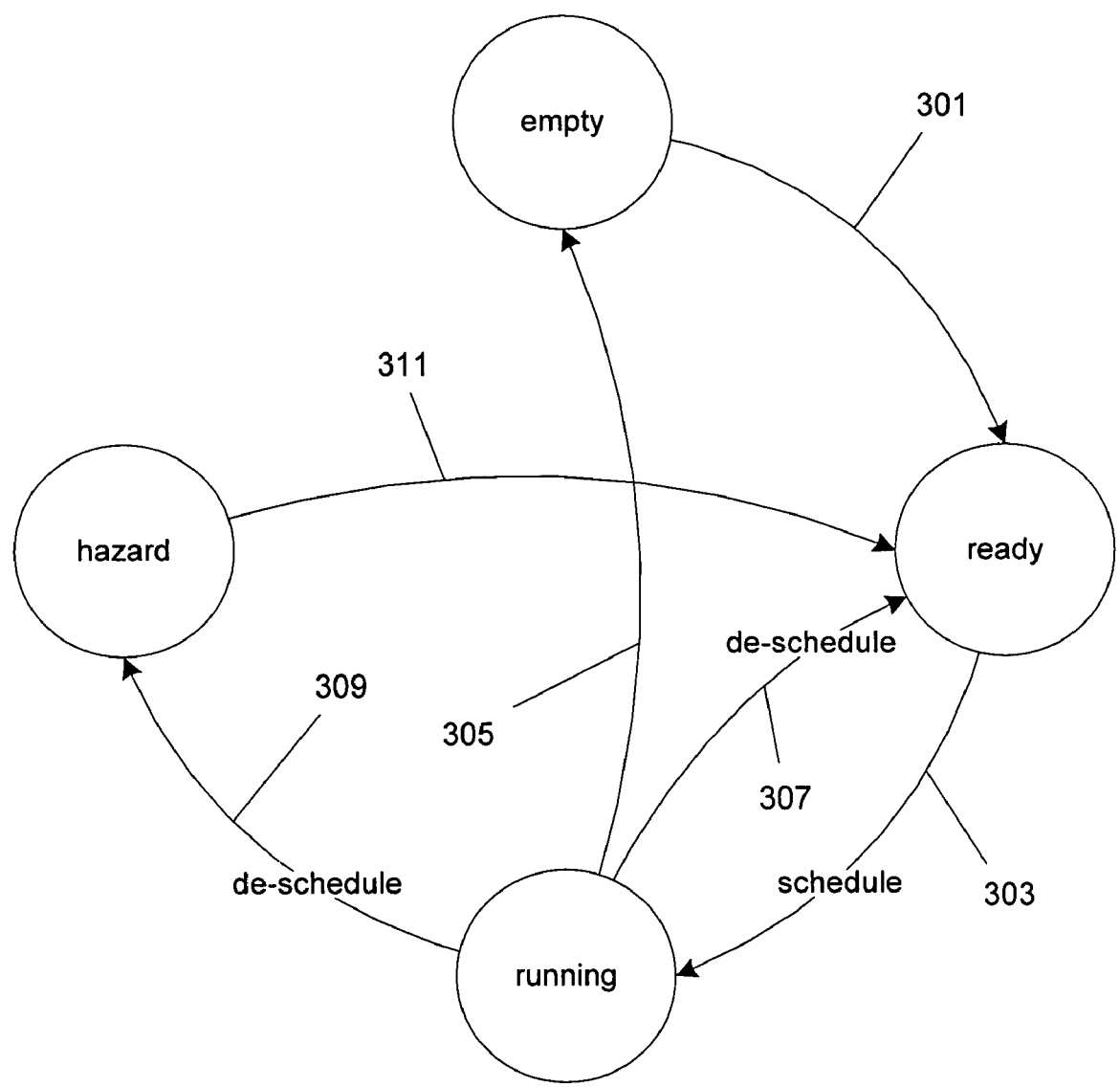
FIG. 3 is a schematic diagram showing transitioning between the four possible states of a thread.

The transitioning between the four states is shown schematically in FIG. 3.

Firstly, the transition 301 from "empty" to "ready" happens when a new thread is submitted and then waits in the resident threads to enter the "running" subset 209.

As for the transition from "ready" to "running" 303, when a space becomes available in the "running" subset (which may happen when a running thread finishes its final instruction thereby freeing up space in the "running" subset), the thread manager selects one of the "ready" threads and transits it to the "running" state. This is known as scheduling the thread. The thread manager may use an algorithm to select the ready thread for transition from the resident ready threads. It may use a simple round-robin approach.

As for the transition 305 from "running" to "empty", the instruction decoder can tell when it receives the final instruction of a particular thread. When that happens, it tells the thread manager to move the state of that thread from "running" to "empty" by communicating along the interface 119 (see FIG. 1) with a command that includes the thread ID 201 and a command to make the thread "empty". This will then free up space in the "running" subset so that another ready resident thread can be transited to "running" 303.

Finally, the transition 307 from running back to "ready" might happen if the processor supports a timer such that the number of the clock ticks that any given thread could remain running is limited. Then, if a thread exceeds this threshold, it would transit back to the "ready" state from the "running" state. This could be achieved via a command from the instruction decoder to the thread manager via the interface 119 in FIG. 1. The command includes the thread ID 201 and a command to make the thread "ready". This type of mid-thread transition is known as de-scheduling the thread. Because the thread has not been completed, it transits to "ready" rather than "empty", and the thread will need to be scheduled again at a later point in order to complete. The act of de-scheduling the thread will cause the thread manager to run an algorithm to choose one of the "ready" threads to schedule, because a space will be available in the "running" subset.

Transitions 309 and 311 to and from the hazard state will be described below.

Note that the thread manager can transit thread states in a single clock tick since they are resident.

The description above relates to the short latency instructions only, when the data hazards can be avoided relatively easily by selecting the number of the threads permitted to be in the "running" subset. The processing of the long latency instructions will now be described.

To absorb the latency of the long latency instructions two features are used: hazard counters and the hazard state.

Referring to FIG. 2, column 207 shows the hazard counter values for each thread. In this example there are three hazard counters and they can each take any value from 0 to 7. However, the number of the hazard counters may be different and/or the number of the values each hazard counter can take may also be different. The hazard counter values are actually stored in the instruction decoder but the thread manager has access to the hazard counter values.

The instruction decoder can tell whether the instruction it has just received is a short latency instruction or a long latency instruction. If the instruction is the long latency instruction, the instruction decoder automatically increments one of the hazard counters (more on which one later) by one. Then, it sends the instruction for execution as it would for any short latency instruction. The nominated hazard counter, as well as the thread ID are passed down the processor pipeline for these long latency instructions so that, when the data is finally written to the destination register, the hazard counter and the thread ID are present on the interface.

As the data is being written to the register store 111, the instruction decoder looks at the hazard counter and the thread ID (see 121 in FIG. 1) and decrements the hazard counter for the particular thread so that the loop is closed.

Figure 4:
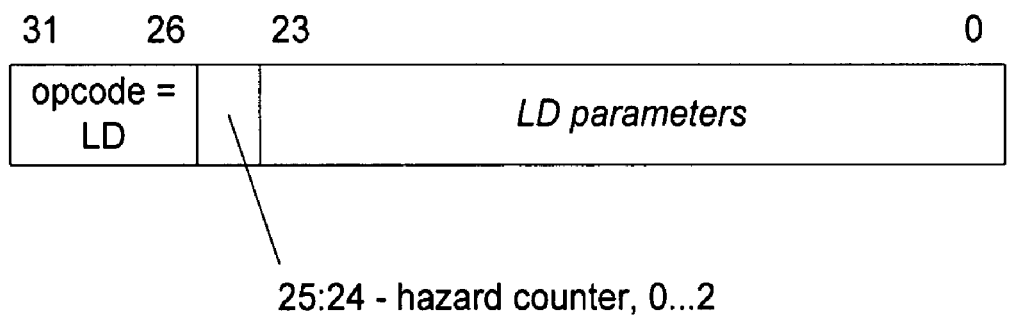
FIG. 4 is a schematic diagram of a 32-bit long latency memory load instruction.

An example of such a long latency instruction is shown in FIG. 4. The instruction shown in FIG. 4 is a 32 bit memory load instruction and it comprises 24 bits of payload, 6 bits of operation instruction and 2 bits indicating the hazard counter to be incremented.

So, as the long latency instructions are fed into the instruction decoder, the instruction decoder increments an appropriate hazard counter. When the long latency instructions are completed, the instruction decoder decrements the hazard counter. Thus, the hazard counter of any thread will depend on how many of its long latency instructions are currently running. Thus, if there are no outstanding destination register writes, the hazard counter will be zero, but if there are any outstanding destination register writes, the hazard counter will be non-zero. Thus, referring to FIG. 2, the thread ID 11 has two writes currently outstanding, since its first hazard counter value is 2.

The number of the long latency instructions that can be running at any time, depends on the number of the hazard counters and the maximum value that those hazard counters can each take. In this case, 21 (3×7) long latency instructions can be running for a particular thread. If a further long latency instruction were to enter the instruction decoder, the processor would stall until one of the currently running long latency instructions is completed, thus decreasing the hazard counter, so that the processor could restart at that time.

In the preferred embodiment, a WHC (Wait for Hazard Counters) instruction precedes an instruction which depends upon an earlier instruction that has been completed before it can be implemented correctly (i.e. if it were processed first there might be a data hazard). (An alternative approach would be to include WHC bits in the instruction itself and this possibility is discussed further below.) When the instruction decoder receives the WHC instruction, it knows it must check the hazard counters for the thread or threads indicated in the WHC instruction. This is because the WHC instruction precedes an instruction (or instructions) that depends on an earlier instruction having been completed. If there is a non-zero hazard counter for that thread or threads, there are outstanding register writes. When the instruction decoder checks the hazard counters for that thread, if the hazard counters are zero, nothing happens and the instruction decoder will proceed to the next instruction for execution as normal. (The WHC instruction itself just dies in the instruction decoder since it has performed its purpose.) On the other hand, if the hazard counters are non-zero, the instruction decoder tells the thread manager to transit the thread into the "hazard" state (transition 309 in FIG. 3) via the interface 119 (FIG. 1).

The WHC instruction does not need to immediately precede the instruction which depends on an earlier instruction that has been completed before it can be implemented correctly. As long as the WHC instruction is somewhere between the long latency instruction and the instruction which depends on completion of that long latency instruction, the WHC instruction will achieve its purpose. Also a single WHC instruction enables lots of later instructions. For example, the result of a single long latency instruction is later used by many instructions. The later instructions will be indicated in the WHC instruction.

When a thread has been moved from the "running" state to the "hazard" state, a space becomes available in the "running" subset 209. Another resident thread which is in the "ready" state can then be scheduled i.e. moved to the "running" state, (transition 303 in FIG. 3), so as to absorb the latency of the thread while it remains in the "hazard" state. The larger the gap between the number of the resident threads (in this case 16) and the number of the threads permitted in the "running" subset (in this case 4), the more likely it will be that the thread manager finds a thread in the "ready" state which can be scheduled to absorb the latency of the "hazard" thread.

But once the thread is in the hazard state, at every clock tick, the thread manager looks at the hazard counters of any threads that are in the hazard state. The hazard counters will decrease as the long latency instructions are being completed. If the hazard counters are still non-zero, the thread manager takes no action and leaves the thread in the "hazard" state. If the hazard counters have, by now, reduced to zero, the thread can be transited from the "hazard" state to the "ready" state by the thread manager. This is the transition 311 in FIG. 3. Thus, once the hazard counters have decreased to zero, there are no outstanding destination register writes. Thus there is no chance that the WHC instruction will be processed out of order, thereby causing the data hazard.

In fact, the thread manager does not need to look at the hazard counters of the "hazard" threads at each and every clock tick. As long as the thread eventually makes the transition from the "hazard" state to the "ready" state, the checking can be done every few clock ticks. This would be advantageous when working at high frequencies and could also reduce gate count.

It was discussed earlier that there may be several hazard counters and the instruction decoder nominates one to increment for each long latency instruction. In this example, there are three hazard counters, each of which can take a value from 0 to 7.

Figure 5:
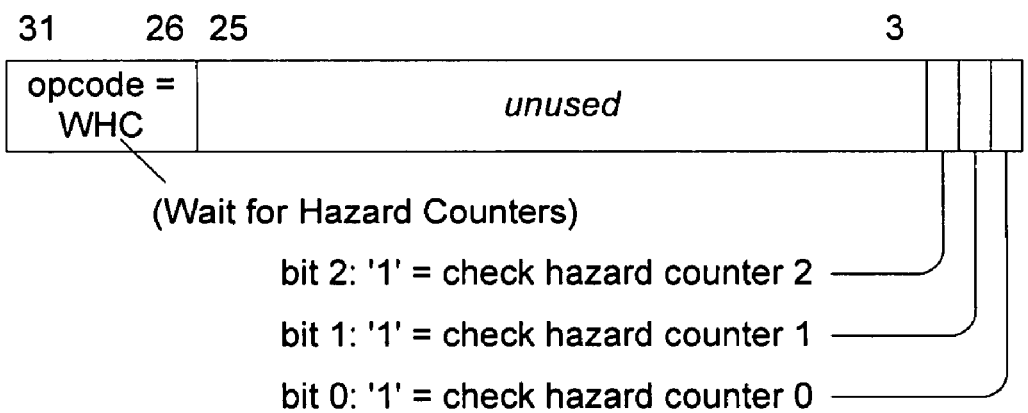
FIG. 5 is a schematic diagram of a 32-bit WHC instruction.

FIG. 5 shows a WHC instruction (i.e. one that precedes an instruction which depends on earlier instructions). The WHC instruction includes three bits, each of which correspond, to a hazard counter. If any of the bits is non-zero, this is an indication that the corresponding hazard counter should be checked before the next instruction is implemented. The compiler should choose a hazard counter to be assigned to each long latency instruction in a manner that optimizes the performance of the latency absorption.

The compiler which produces the instructions executed by the processor, should be optimized to place the WHC instruction immediately before the instruction which uses the result of the long latency instruction. Thus, the WHC indication is received before the instruction is processed. Also, the compiler should try to position the WHC instructions in the thread, as far as possible from the long-latency instructions which increment the corresponding counters. This will minimize the number of the threads in the hazard state. This may be done by the compiler reorganising the order of the instructions.

For example, a WHC instruction might not depend on all long latency instructions having been processed before it is processed, but simply depends on some of the long latency instructions in its thread. In that case, the long latency instructions on which the WHC instruction depends, can be nominated to increment, say, the first hazard counter. On the other hand, the long latency instructions on which the WHC instruction does not depend can be nominated to increment, say, the second hazard counter. Then, in the WHC instruction, the bit corresponding to the first hazard counter will be non-zero, whereas the bit(s) corresponding to the other hazard counter(s) will be zero. Then, the instruction decoder knows that the only hazard counter which needs to be checked is the first hazard counter, since the other hazard counters are not relevant to this particular WHC instruction. Referring to FIG. 4, the hazard counters to increment are indicated at bit numbers 25 and 26.

Consider the example of an instruction stream below, which is a good use of the hazard counters. Note that "Load" instructions are the long latency instructions in the following examples and "Add" instructions are the short latency instructions.

1) Load register location (r) 0 and increment hazard counter (HC) 0;
2) Load r 1 and increment HC 0;
3) Load r 2 and increment HC 1;
4) Load r 3 and increment HC 1;
5) Load r 4 and increment HC 2;
6) Load r 5 and increment HC 2;
7) Wait for HC 0 to decrease to value 0;
8) Add r 0 and r 1 and put in r 9;
9) Wait for HC 1 to decrease to value 0;
10) Add r 2 and r 3 and put in r 10;
11) Wait for HC 2 to decrease to value 0;
12) Add r 4 and r 5 and put in r 11.

Contrast the instruction stream above with the following instruction stream, which does not make good use of the hazard counters:
1) Load r 0 and increment HC 0;
2) Load r 1 and increment HC 0;
3) Load r 2 and increment HC 1;
4) Load r 3 and increment HC 1;
5) Load r 4 and increment HC 2;
6) Load r 5 and increment HC 2;
7) Wait for HC 0, HC 1 and HC 2 to decrease to value 0;
8) Add r 0 and r 1 and put in r 9;
9) Add r 2 and r 3 and put in r 10;
10) Add r 4 and r 5 and put in r 11.

In the second example, all three hazard counters must reduce to zero before any of the subsequent instructions can be implemented. But, this is not particularly efficient since the instruction to put the sum of r 0 and r 1 into r 9, for example, only depends on r 0 and r 1 and not on the other register locations. So, the thread will be in the "hazard" state for longer. The first example makes much better use of the hazard counters. By dividing up the long latency instructions across the available hazard counters, instructions can start earlier thereby providing a running thread to absorb hazards on other threads. The compiler knows the difference between the long latency instructions and the short latency instructions, and also knows which instructions depend on which earlier instructions, so that the compiler can make efficient use of the hazard counters.

In the FIG. 4, the hazard counters are nominated in the long-latency instruction. However, this does not need to be the case and an alternative method would tie the hazard counter number to the least significant bits of the destination register address. So, for example, any loads into register location 0 will increment hazard counter 0, but any loads into register location 5 will increment hazard counter 1. This conserves valuable instruction encoding space, but makes it difficult to implement complex addressing modes such as indexing, where the actual destination register address is not known by the compiler or the instruction decoder.

In this example, the WHC instructions support checking of more than one hazard counter at a time. That is, in the example of FIG. 5, the WHC supports checking of three hazard counters since there are three WHC bits in the WHC instruction. However, this does not necessarily need to be the case. Each WHC instruction could simply nominate a single hazard counter which should be checked. In this case a first WHC instruction could nominate HC1 to check and a second WHC instruction could nominate HC2 to check, and so on. This would save on a small number of gates.

A number of general points should be noted regarding the above embodiment. The described embodiment includes 16 resident threads, of which up to 4 are in the "running" subset at any time. But the system also scales to very high clock frequencies. As the clock frequency increases, the latency, in terms of clock ticks, of both the short latency and the long latency instructions increases. This means that the number of the threads in the "running" subset can be increased to satisfy the new, higher latency of the short latency instructions. And, the number of the resident threads can also be increased to compensate.

Other points about the described embodiments are as follows:

Before a thread can terminate, the hazard counters must all be zero. (This is fairly clear because a non-zero hazard counter means that there is an outstanding instruction.)

The instruction decoder stores the hazard counters for all the threads. The hazard counters can be non-zero when the thread is in the hazard state. As soon as the hazard counters are zero, at the next check, the thread manager will transit them to the ready state.

In some cases, the hazard counters can be non-zero in the running state. This occurs when a long latency instruction is executed (which increments the hazard counter) but before a WHC instruction has arrived. Or, even when a WHC instruction has arrived, it may not correspond to that hazard counter, so the thread will remain in the running state.

The example described above with reference to FIGS. 1 to 5 shows hardware for performing the method. The method of the invention could of course alternatively be implemented in software.

An alternative, efficient use of the hazard counters is as follows. In SIMD processors, one long-latency instruction might start several register writes via an external unit. A problem might be encountered with this because the instruction decoder might only increment the hazard counter by 1 at the outset but might try to decrement the hazard counter several times at the end, once for each register write. This invention can cope with this by passing a flag around the pipeline which indicates just the final register write for the instruction. When the instruction decoder sees this flag, it will know to decrement the hazard counter. So, each long latency instruction only increments the hazard counter by one, even if there are multiple register writes. It is possible that the hazard counters could be used in a different way. For example, the hazard counter could be incremented at the outset, once for each register write rather than once for the entire long latency instruction. Then, no flag would be needed because the instruction decoder would just decrement the hazard counter by one, once each register write is completed. This way of using the hazard counters is equally valid but does mean that the hazard counters are used up more quickly, increasing the likelihood of a stall for fewer long latency instructions in the pipeline.

In addition, it is possible to use the WHC instructions in a slightly different way. The functionality of the WHC instruction could be integrated into all the "regular" instructions thereby eliminating it as an additional instruction. In this case, there are bits in the instruction encoding which tell the instruction decoder which hazard counters, if any, to wait for. These bits do not need to be on every instruction, but for instructions which do not have them, they cannot be configured to wait for data to return from the long-latency instructions. The benefit is a reduction in the size of programs and instruction bandwidth but at the cost of instruction encoding bits.

In the introduction, a number of requirements are set out which the invention has to meet while solving the problems.

Firstly, in a multi-threaded processor, many threads might have potential data hazards. This is satisfied in the described embodiment, since, of the 16 resident threads, up to 12 can be in the hazard state while 4 are still running. In different embodiments (with a different number of threads permitted to be resident and a different number permitted to be in the running subset), this would also work.

Secondly, each thread might have a large number of the long latency instructions. This is also satisfied here by the number of hazard counters and the range of values that each hazard counter can take. In the described embodiment, the hardware provides three hazard counters, each of which can run from value 0 to value 7. Therefore, each resident thread can guarantee that 21 long latency instructions can be outstanding and undergoing processing, before the processor stalls. If the number of the long latency instructions is particularly high, the number of the hazard counters or the range of values that each could take will increase. If it is sufficient, the number of the hazard counters could be decreased. In a preferred embodiment used in practice, only two hazard counters are used, each taking a value between 0 and 15.

It also must be possible for the return data from the long latency instructions to come back in a different order from which they were dispatched. This is satisfied by the following instruction stream which may be executed:
1) Load r 0 and increment HC 0 (long latency Load instruction);
2) Sample r 1 and increment HC 0 (this is a long latency sampling instruction);
3) Wait for HC 0 to decrease to value 0;
4) Add r 0 and r 4 and put in r 2 (short latency Add instruction);
5) Add r 1 and r 5 and put in r 3.

In this example, which would work with this invention, r 1 can be written by the texture sampling unit before r 0 is written to by the memory interface. Both of the instructions only decrement HC 0 so the order is not important.

We must also reduce, as much as possible, processor stalling due to the data hazards from the long latency instructions. The largest gains are expected to be due to the threads getting de-scheduled on WHC instructions because fresh threads will be scheduled, which will run for some time before they encounter any WHC instructions themselves. In addition, the WHC instruction does not have to come right after the long latency instruction. It should come immediately before the data is sourced. Useful instructions can be inserted in between the long latency instruction and the WHC which will further absorb latency. By having multiple hazard counters, time spent waiting for data that is not actually required is reduced. For example, consider the following instruction stream in a system with only two hazard counters, HC 0 and HC 1:
1) Load r 0 and increment HC 0 (long latency Load instruction);
2) Load r 1 and increment HC 0;
3) Load r 2 and increment HC 1;
4) Wait for HC 0 to decrease to value 0 (i.e. wait for r 0 and r 1);
5) Add r 0 and r 10 and put in r 3 (short latency Add instruction);
6) Add r 3 and r 11 and put in r 4;
7) Add r 4 and r 12 and put in r 5;
8) Add r 5 and r 1 and put in r 6 (first time r 1 is used);
9) Add r 6 and r 13 and put back in r 6;
10) Add r 6 and r 14 and put back in r 6;
11) Add r 6 and r 15 and put back in r 6;
12) Wait for HC 1 to decrease to value 0;
13) Add r 2 and r 6 and put back in r 6.

In this example the latency absorption of a system with two counters is worse than one with three counters.

It is possible to skip over any instructions in the thread so as to support flow control such as branches. This is satisfied here since every long latency instruction increments the hazard counter when it is decoded and decrements the hazard counter when it is written to the destination register. Regardless of whether there is a WHC instruction or not, this incrementing and decrementing always happen and the coherency of the hazard counters is always maintained. A thread cannot terminate until all the hazard counters for the thread are zero.

It is also possible to read results in a different order than they were written. The following example illustrates this point:
1) Load r 0 and increment HC 0;
2) Load r 1 and increment HC 0;
3) Wait for HC 0 to decrease to value 0;
4) Add r 1 and r 4 and put in r 2;
5) Add r 0 and r 5 and put in r 3.

In this example, r 0 load is carried out before r 1 load but r 0 add is carried out after r 1 add.

Multiple read access for destinations is also possible. The following example illustrates this point:
1) Load r 0 and increment HC 0;
2) Wait for HC 0 to decrease to value 0;

3) Add r 0 and r 4 and put in r 2;
4) Add r 0 and r 5 and put in r 3.

In this example, r 0 must be read twice for each of instructions 3) and 4).

It is also permitted for the same destination to be written to and re-used as a destination for another long latency instruction. The following example illustrates this point:
1) Load r 0 and increment HC 0;
2) Wait for HC 0 to decrease to value 0;
3) Add r 0 and r 4 and put in r 2;
4) Load r 0 and increment HC 0;
5) Wait for HC 0 to decrease to value 0;
6) Add r 0 and r 5 and put in r 3;

In this example, r 0 is written to twice.

Finally, it is preferable that no special or extra storage is needed in processing the long latency instructions and potential data hazard instructions. The data returning from the external units does not need to go into special storage, like a FIFO, but it can go straight into the nominated destination register. It is up to the compiler to make sure that there are no instruction writes to the same destination register. Otherwise a WHC instruction is required first.

It is also preferable that the gate costs are kept to a minimum. The system is scalable. The number of the hazard counters can be adjusted and the maximum hazard counter value can also be adjusted. One thing this affects is how many long latency instructions can be dispatched per thread before stalling occurs due to the hazard counters saturating. The amount of the storage per resident thread is minimal: just 12 bits per thread for three hazard counters ranging from 0 . . . 7.

The invention claimed is:

1. A method for processing a thread in a pipelined processor, the thread comprising a plurality of sequential instructions, the plurality of the sequential instructions comprising short-latency instructions, long-latency instructions and at least one hazard instruction, the hazard instruction requiring one or more preceding instructions to be processed before the hazard instruction is processed, the method consisting essentially of the steps of:
   before processing each long-latency instruction, incrementing by one, a counter associated with the thread;
   after processing each long-latency instruction, decrementing by one, the counter associated with the thread;
   before processing each hazard instruction, checking a value of the counter associated with the thread; and
   if the counter value is zero, processing the hazard instruction, or if the counter value is not zero, pausing processing of the hazard instruction until a later time; and
   processing a subset of a plurality of the threads by executing one instruction from each thread in the subset; and
   after processing a final instruction of the thread, removing the thread from the subset of the plurality of the threads; and
   periodically checking the value of the counter associated with any threads having instructions that have been paused when the counter value is not zero, and, if the value of the counter of the thread is zero, transiting that thread to a waiting-to-be-processed state.

2. The method according to claim 1, wherein the method is for processing a plurality of threads, each thread having a respective counter associated therewith.

3. The method according to claim 1, wherein each thread in the processor is, at any time, either: being processed, waiting to be processed, or paused.

4. The method according to claim 3 further comprising the step of processing the subset of the plurality of the threads by executing one instruction from each thread in the subset in a round robin manner.

5. The method according to claim 3, wherein the number of the threads in the subset is equal to a maximum number of clock ticks required to process the short-latency instruction.

6. The method according to claim 1, wherein the step of periodically checking is carried out every clock tick.

7. The method according to claim 2, wherein the processor is arranged to process any number of the threads up to the plurality of the threads, such that, at any time zero, one or more locations of the plurality of the threads are empty.

8. The method according to claim 1, wherein each thread has a plurality N of respective counters associated therewith, and the checking step comprises the steps of: before processing each hazard instruction, checking the value of at least one of the N counters associated with the thread; and if all of the values of at least one of the counters are zero, processing the hazard instruction, or if one or more of the values of at least one of the counters are not zero, pausing processing of the hazard instruction until a later time.

9. The method according to claim 8, wherein each long-latency instruction includes an indication of which of the N counters should be incremented before the long-latency instruction is processed and decremented after the long-latency instruction is processed.

10. The method according to claim 9, wherein each hazard instruction is preceded by an instruction that includes an indication of which of the N counters should be checked before the hazard instruction is processed.

11. The method according to claim 9, wherein each hazard instruction includes an indication of which of the N counters should be checked before the hazard instruction is processed.

12. A pipelined processor for processing a thread, the thread comprising a plurality of sequential instructions, the plurality of the sequential instructions comprising short-latency instructions, long-latency instructions and at least one hazard instruction, the hazard instruction requiring one or more preceding instructions to be processed before the hazard instruction is processed, the processor consisting essentially of:
   a counter associated with the thread;
   means for incrementing the counter by one, before each long-latency instruction is processed;
   means for decrementing the counter by one, after each long-latency instruction is processed;
   means for checking the value of the counter associated with the thread, before each hazard instruction is processed; and
   means for processing the hazard instruction if the counter value is zero, or pausing processing of the hazard instruction until a later time if the counter value is not zero; and
   a thread manager; and
   means for processing a subset of the plurality of the threads by executing one instruction from each thread in the subset; and
   means for periodically checking the value of the counter associated with any threads having instructions that have been paused when the counter value is not zero, and, if the value of the counter of the thread is zero, transiting that thread to a waiting-to-be-processed state.

13. The processor according to claim 12, wherein the means for incrementing the counter and the means for decrementing the counter comprise an instruction decoder, the instruction decoder being able to distinguish between the short-latency instructions and the long-latency instructions.

14. The processor according to claim 13 further comprising the thread manager.

15. The processor according to claim 12, wherein the means for checking the value of the counter associated with the thread before the hazard instruction is processed comprises an instruction decoder, the instruction decoder being able to distinguish between the hazard instructions and the remaining instructions.

16. The processor according to claim 12, wherein the processor is suitable for processing a plurality of threads, each thread having a respective counter associated therewith.

17. The processor according to claim 12, wherein the thread in the processor is, at any time, either being processed, waiting to be processed, or paused.

18. The processor according to claim 17 further comprising the means for processing the subset of the plurality of the threads by executing one instruction from each thread in the subset in a round robin manner.

19. The processor according to claim 17, wherein the number of the threads in the subset is equal to a maximum number of clock ticks required to process the short-latency instruction.

20. The processor according to claim 17, wherein the means for periodically checking and transiting checks the value of the counter every clock tick.

21. The processor according to claim 16, wherein the processor is arranged to process any number of the threads up to the plurality of the threads, such that, at any time zero, one or more locations of the plurality of the threads are empty.

22. The processor according to claim 12, wherein each thread has a plurality N of respective counters associated therewith and the means for checking the value of the counter associated with the thread further comprises means for checking the value of at least one of the N counters associated with the thread before processing each hazard instruction, and means for processing the hazard instruction if all of the values of at least one of the counters are zero, or pausing processing of the hazard instruction until a later time if one or more of the values of at least one of the counters are not zero.

23. The processor according to claim 22, wherein each long-latency instruction includes an indication of which of the N counters should be incremented before the long-latency instruction is processed and decremented after the long-latency instruction is processed.

24. The processor according to claim 23, wherein each hazard instruction is preceded by an instruction that includes an indication of which of the N counters should be checked before the hazard instruction is processed.

25. The processor according to claim 23, wherein each hazard instruction includes an indication of which of the N counters should be checked before the hazard instruction is processed.

26. A method for processing a thread in a pipelined processor, the thread having a plurality of respective counters associated therewith and a plurality of sequential instructions, the plurality of the sequential instructions comprising some short-latency instructions, some long-latency instructions and at least one hazard instruction, the hazard instruction requiring one or more preceding instructions to be processed before the hazard instruction is processed, the method comprising the steps of:

before processing each long-latency instruction, incrementing by one, a counter, among the plurality of the counters, associated with the thread;

after processing each long-latency instruction, decrementing by one, the counter associated with the thread;

before processing each hazard instruction, checking a value of at least one of the plurality of the counters associated with the thread; and if all of the values of at least one of the counters are zero, processing the hazard instruction, or if one or more of the values of at least one of the counters are not zero, pausing processing of the hazard instruction until a later time, wherein an indication of which of the plurality of the counters should be incremented and decremented is included in the long-latency instruction.

27. The method according to claim 26, wherein each hazard instruction is preceded by an instruction that includes an indication of which of the plurality of the counters should be checked before the hazard instruction is processed.

28. The method according to claim 26, wherein each hazard instruction includes an indication of which of the plurality of the counters should be checked before the hazard instruction is processed.

29. A pipelined processor for processing a thread, the thread having a plurality of sequential instructions, the plurality of the sequential instructions comprising some short-latency instructions, some long-latency instructions and at least one hazard instruction, the hazard instruction requiring one or more preceding instructions to be processed before the hazard instruction is processed, the processor comprising:

a plurality of counters associated with the thread;

means for incrementing by one, a counter among the plurality of the counters, before each long-latency instruction is processed;

means for decrementing by one, the counter among the plurality of the counters, after each long-latency instruction is processed;

means for checking the value of at least one of the plurality of the counters associated with the thread, before each hazard instruction is processed; and means for processing the hazard instruction if all of the values of at least one of the counters are zero, or pausing processing of the hazard instruction until a later time if one or more of the values of at least one of the counters are non-zero, wherein an indication of which of the plurality of the counters should be incremented and decremented is included in the long-latency instruction.

30. The processor according to claim 29, wherein each hazard instruction is preceded by an instruction that includes an indication of which of the plurality of the counters should be checked before the hazard instruction is processed.

31. The processor according to claim 29, wherein each hazard instruction includes an indication of which of the plurality of the counters should be checked before the hazard instruction is processed.

32. A computer readable non-transitory storage medium having stored thereon a computer program which, when run on computing means, causes the computing means to process a thread in a pipelined processor, the thread having a plurality of respective counters associated therewith and a plurality of sequential instructions, the plurality of sequential instructions comprising some short-latency instructions, some long-latency instructions and at least one hazard instruction, the hazard instruction requiring one or more preceding instructions to be processed before the hazard instruction is processed, the computing means processing the thread with the steps of:

before processing each long-latency instruction, incrementing by one, a counter among the plurality of the counters associated with the thread;

after processing each long-latency instruction, decrementing by one, the counter associated with the thread, before processing each hazard instruction, checking a value of at least one of the plurality of the counters associated with the thread; and if all of the values of at least one of the counters are zero, processing the hazard instruction or, if one or more of the values of at least one of the counters are not zero, pausing processing of the hazard instruction until a later time, wherein an indication of which of the plurality of the counters should be incremented and decremented is included in the long-latency instruction.

33. A computer readable non-transitory storage medium storing thereon a computer program which, when run on computing means, causes the computing means to process a thread in a pipelined processor, the thread comprising a plurality of sequential instructions, the plurality of sequential instructions comprising some short-latency instructions, some long-latency instructions and at least one hazard instruction, the hazard instruction requiring one or more preceding instructions to be processed before the hazard instruction is processed, the computing means processing the thread with the steps consisting essentially of:

before processing each long-latency instruction, incrementing by one, a counter associated with the thread;

after processing each long-latency instruction, decrementing by one, the counter associated with the thread;

before processing each hazard instruction, checking a value of the counter associated with the thread;

if the counter value is zero, processing the hazard instruction, or if the counter value is not zero, pausing processing of the hazard instruction until a later time;

processing a subset of the plurality of the threads by executing one instruction from each thread in the subset;

after processing a final instruction of the thread, removing the thread from the subset of the plurality of the threads; and periodically checking the value of the counter associated with any threads having instructions that have been paused when the counter value is not zero, and, if the value of the counter of the thread is zero, transiting that thread to a waiting-to-be-processed state.

34. The processor according to claim 14, wherein the counter is maintained by the instruction decoder but is accessed by the thread manager.

* * * * *